United States Patent Office 2,915,562
Patented Dec. 1, 1959

2,915,562
REACTION OF ALKALI METALS WITH EPOXIDES

Irving L. Mador and Robert E. Robinson, Cincinnati, Ohio, assignors to National Distillers and Chemical Corporation, New York, N.Y., a corporation of Virginia No Drawing. Application September 16, 1958
Serial No. 761,282

9 Claims. (Cl. 260—618)

The present invention relates to a novel process for preparation of alkali metal derivatives from epoxy compounds and, more particularly, to a novel process for preparation of dialkali metal salts of diols by reaction of an alkali metal with an epoxy compound, the desired product consisting of two units of the epoxy compound joined after ring-opening through a carbon-to-carbon bond.

In accordance with this invention, an alkali metal is reacted with a compound containing an epoxy group, at a relatively low temperature, using for the reaction a molar ratio of the alkaline metal to epoxy compound of less than two and preferably from about ½ to less than 2 moles of the alkali metal per mole of the epoxy compound whereby ring opening of the epoxy compound is effected with dimerization to produce a dialkali metal salt of a diol. Although the invention embodies a more generic scope than the use of an epoxy compound such as styrene oxide and sodium for such a reaction, the following equation illustrates a specific embodiment for preparation of a disodium salt of a 1,4-diol by use of such specific reactants in the process embodied herein.

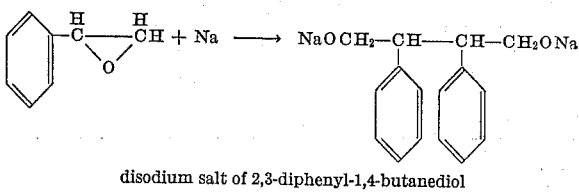

disodium salt of 2,3-diphenyl-1,4-butanediol

On hydrolysis of such a reaction product, 2,3-diphenyl-1,4-butanediol is obtained. By use of ethylene oxide in place of styrene oxide, such a reaction results in the disodium salt which on hydrolysis is converted to 1,4-butanediol. Use of propylene oxide ultimately provides 2,3-dimethyl-1,4-butanediol or an isomer thereof, 2,5-hexanediol, and, from butadiene monoxide, a mixture of dihydroxyoctadienes is obtained which, on hydrogenation, is converted to a mixture of the corresponding saturated $C_8$ diols.

For the process embodied herein, any of the alkali metals may be used, including potassium, sodium and lithium but, preferably, sodium is employed. Particularly suitable for such use are alkali metals in finely divided form dispersed in a suitable carrier that is chemically inert in the described reaction and is liquid under the conditions at which the reaction is carried out. In general, suitable for such use are substances that do not contain an active hydrogen atom, as do acids and alcohols. Thus, and for example, suitable carrier substances for the alkali metal dispersion include toluene, xylene, etc. butyl ether, 1,2-dimethoxyethane, 1,2-diethoxyethane, mineral spirits, kerosene, isooctane, octane, decalin, etc.

As aforesaid, the process embodied herein utilizes an epoxy compound as, for example, a 1,2-epoxy compound having a

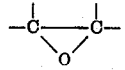

group which, under the conditions of the described reaction, has been found to undergo ring-opening and dimerization to form the dialkali metal salt of a dimer of the resulting ring-opened epoxy compound. Thus, epoxy compounds suitable for practice of this invention include compounds of the structure

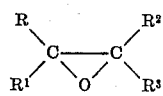

wherein R, $R^1$, $R^2$ and $R^3$ can be hydrogen, such as in ethylene oxide; wherein R, $R^1$ and $R^2$ can be hydrogen and $R^3$ an alkene group such as in butadiene monoepoxide or where $R^3$ may be an alkyl group as in propylene oxide, or where R and $R^3$ may be aliphatic as in butene-2 oxide, or where $R^3$ may be aromatic as in styrene oxide. Still other epoxy compounds for such a reaction include compounds of the foregoing structure which contain a hydrocarbon ring, as in cyclohexane oxide, or a heterocyclic group, such as epoxyethylpyridine, epoxyethyltetrahydrofuran, and the like, and, also, epoxy compounds that contain functional groups such as in epichlorohydrin or from an epoxidized fatty acid (e.g., epoxy oleic) as well as salts and esters thereof. Thus, and as aforesaid, the invention is in general directed to use of epoxy compounds which may or may not contain substituted groups as aforedefined for illustrative purposes, as, under the conditions under which the process embodied herein is carried out, the epoxy grouping has been found to undergo ring-opening and dimerization of the resulting ring-opened epoxy compounds to provide dialkali metal salts of a diol.

Regarding the relative amounts of reactants to employ to obtain the results embodied herein, it is preferred to use a substantially equimolar ratio of the epoxy compound to the alkali metal. That is, and based on the total amount of epoxy compound that is ultimately employed, it is preferable to use until completion of the reaction a substantially equimolar amount of the alkali metal. However, more or less proportional amounts of the alkali metal may be used such as, for example, from about ½ to <2 moles of the alkali metal per mole of the epoxy compound and, more spectfically, from about 0.9 to about 1.1 moles of alkali metal per mole of the epoxy compound.

The process embodied herein is carried out at a temperature of below about 0° C. and preferably at below −20° C. as, at such relatively low temperatures, the epoxy compounds have been found to undergo the aforedescribed ring-opening and dimerization to provide the dialkali metal salts of diols.

In carrying out the aforesaid reaction, the alkali metal is preferably reacted with the epoxy compound in presence of a reaction medium that, at the conditions under which the reaction is carried out, is liquid and is chemically inert. For such a purpose, substances such as organic ethers, tertiary amines, and the like, may be used as well as mixtures of such substances. Of such substances, organic ethers represent preferred embodiments with examples thereof including ethers such as tetrahydrofuran, dimethyl ether, 1,2-dimethoxyethane, 1,2-diethoxyethane, methyl ethyl ether, dioxane, and others whereas tertiary amines include N-methylmorpholine, trimethylamine, etc.

In order to further describe the invention, several embodiments are set forth hereinafter for purposes of illustration and not limitation.

EXAMPLE 1

An oven dried, 1000 ml. flask equipped with dropping funnel, paddle-type stirrer, thermometer and nitrogen blanket was charged with 350 ml. of tetrahydrofuran and 0.38 g. atom of sodium dispersed in decalin as a 25% by weight dispersion of sodium particles having a particle size averaging about 1 to 2 microns. The mixture was cooled to −30° C. and one gram of p-terphenyl was added (in 50 ml. of tetrahydrofuran) through the dropping funnel. The mixture was then cooled to −75° C. and 45.6 g. (0.38 mole) of styrene oxide in 100 ml. of tetrahydrofuran was added over a period of 70 minutes at −75° C. The mixture was stirred for 53 minutes at −75° C., and then allowed to increase in temperature to −20° C. over a 28 minute period. Unreacted sodium was then destroyed by addition of 100 ml. of water.

Of the two liquid phases that resulted, the organic phase was separated and combined with an ether extract of the aqueous layer. By use of heat and suction, volatile solvent was stripped from the organic matter in the combined phases and the organic matter was distilled with steam at 100° C./750 mm. until no further organic material was collected to provide a distillate containing 0.7 g. of 2-phenylethanol.

The residue from the steam distillation was subjected to several extractions with diethyl ether, followed by removal of the ether by evaporation, followed by heating at 75° C. under vacuum. From the resulting residue (45.6 g.), there was obtained 8.8 grams of meso-2,3-diphenyl-1,4-butanediol by crystallization from benzene.

The mother liquor was concentrated, then distilled under reduced pressure (2 mm.) whereby there was obtained 24.4 grams of a substance having a boiling point of 180–200° C. at 2 mm. pressure which analyzed as follows and comprised the racemic isomer (dl) of 2,3-diphenyl-1,4-butanediol.

|  | C | H |
|---|---|---|
| Calculated for $C_{16}H_{18}O_2$ | 79.31 | 7.49 |
| Found for meso isomer | 78.89 | 7.45 |
| Found for dl isomer | 79.21 | 7.53 |

The meso form was further identified by comparison of infra-red spectra and mixed melting point with a sample of the authentic substance (M.P. 148–148.5° C.) obtained by reduction of the dimethyl ester of meso-$\alpha,\alpha'$-diphenyl-succinic acid with lithium aluminum hydride.

EXAMPLE 2

The procedure was essentially that used in the preparation of 2,3-diphenyl-1,4-butanediol in Example 1, except that 28 g. (0.41 mole) of propylene oxide (in place of styrene oxide) and 0.48 g. atom of sodium were used. The propylene oxide in 100 ml. of tetrahydrofuran was added over 29 minutes at −70 to −75° C. The resulting mixture was stirred 15 minutes at −75° C., then allowed to warm. In slightly more than 5 minutes, the temperature rose to −15° C., at which point an exothermic reaction took place raising the temperature from −15° to 45° C. within 10–15 seconds. The stirrer was shut off and the mixture cooled to 15° C. The stirred mixture was allowed to warm to room temperature. The resulting blood red material was treated cautiously with 200 ml. of water, stripped of low-boiling organic matter by heat and suction, and volatile organic material was removed by distillation with steam. The remaining aqueous solution was divided into two 150 ml. aliquots. One portion was saturated with potassium carbonate and extracted several times with ether. The ethereal solution was concentrated by heat and suction and distilled under reduced pressure to yield 2.5 g. of an oil B.P. 115–130°/35 mm., $n_d^{25}$ 1.4552. Infra-red analysis showed that the material was alcoholic. The oil gave a strongly positive iodoform reaction, showing the presence of a

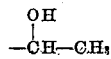

group and gave the following analysis which corresponds to a $C_6$ glycol.

|  | Percent C | Percent H |
|---|---|---|
| Analysis: |  |  |
| Calcd. for $C_6H_{14}O_2$ | 60.96 | 11.94 |
| Found | 61.07 | 11.03 |

EXAMPLE 3

The procedure was essentially that used in the preparation of 2,3-diphenyl-1,4-butanediol of Example 1, except that 34.3 g. (0.49 mole) of butadiene monoxide (in place of styrene oxide) and 0.49 g. atom of sodium were used. The butadiene monoxide in 100 ml. of tetrahydrofuran was added over a period of 60 minutes following a 10 minute stirring period. The mixture was then allowed to warm to room temperature. The unreacted sodium was destroyed by the cautious addition of 25.0 grams of ammonium chloride in 150 ml. of water. The material was transferred to a separatory funnel and the upper organic layer collected and combined with a single ether extract of the aqueous phase. The organic solvents were removed by heat and suction and the alkylate distilled with steam. The aqueous residue contained some solid material which was collected on a filter, washed with methanol and dried to yield 0.9 g. of p-terphenyl, M.P. 212–215° C. The aqueous filtrate (along with the methanol rinse) was extracted with four 100 ml. portions of ether. Concentration of the solution followed by distillation under reduced pressure yielded 8.3 g. of liquid, B.P. 100–114°/1 mm. which was dissolved in methanol and hydrogenated with Adam's catalyst at 50 p.s.i.g. for two hours. The catalyst was removed by filtration and the organic material concentrated by heat and suction. Distillation under 35 mm. pressure yielded two fractions:

|  | g. | B.P., degrees | $n_D^{25}$ |
|---|---|---|---|
| A | 3.0 | 155–165 | 1.4384 |
| B | 2.9 | 165–169 | 1.4564 |

Fraction B was identified as an octanediol (containing 3,6- and 1,8-octanediol) by elemental analysis. Fraction A was twice redistilled to yield a fraction having a boiling point of 110–115°/35 mm. Elemental analysis indicated this to be largely an octanol.

*Analysis*

|  | | |
|---|---|---|
| Calcd. for $C_8H_{18}O_2$ | 65.72 | 12.41 |
| Found (B) | 65.56 | 12.31 |
| Calcd. for $C_8H_{18}O$ | 73.79 | 13.93 |
| Found (C) | 73.21 | 14.44 |

EXAMPLE 4

The procedure followed was essentially that used in the preparation of 2,3-diphenyl-1,4-butanediol except that 21 g. (0.48 mole) of ethylene oxide (in place of styrene oxide) and 0.48 g. atom of sodium dispersed in mineral spirits were used. After reaction and hydrolysis the mineral spirits was removed by steam distillation. The aqueous solution was saturated with sodium chloride and extracted several times with tetrahydrofuran. By distillation of the combined extracts 1,4-butanediol was recovered. Identification was made by boiling point and by comparison of the infrared spectrum with that of an authentic sample.

EXAMPLE 5

Under an atmosphere of nitrogen, 0.376 g. atom of finely dispersed sodium in mineral spirits was charged into a 1000 ml. 3-necked flask equipped with a paddle-type stirrer, thermometer and dropping funnel. The dispersion was diluted with 400 ml. of tetrahydrofuran and cooled to —75° C. followed by, while stirring, addition of 45.2 g. (0.38 mole) of styrene oxide in 100 ml. of tetrahydrofuran at —75° C. The mixture was then allowed to warm to room temperature with stirring. The mixture was then treated with 20 grams of ammonium chloride in 150 ml. of water. The resulting organic layer was collected and combined with one diethyl ether extract of the water layer. The organic solvents were removed by heat and suction and the mixture distilled with steam until no further organic distillate was collected. The residue was extracted with several portions of diethyl ether and the ether removed by heat and suction. Distillation under reduced pressure yielded 5.8 grams of meso-2,3-diphenyl-1,4-butanediol (identified by mixed melting point) and 27.1 grams of the racemic isomer (identified by infrared spectrum).

The various diols, prepared by the process embodied herein are useful for preparation of polyesters, polyurethanes and plasticizers, in the formulation of automobile antifreezes and hydraulic fluids, and possess utility as humectants or as chemical intermediates such as by conversion of 2,3-diphenyl-1,4-butanediol to 2,3-diphenyl-1,4-dichlorobutane or to 2,3-diphenylsuccinic acid.

In preferred embodiment, the aforedescribed reaction is carried out in the presence of a compound of the polycyclic aromatic class and, particularly, to obtain optimum yields of the desired product when the alkali metal reactant is used in a form that is not as active as extremely finely divided alkali metal dispersions. Hence, though use of such polycyclic aromatics is not essential but is preferred, compounds suitable therefor when used include condensed ring hydrocarbons such as naphthalene and phenanthrene, as well as the uncondensed polycyclic compounds such as diphenyl, the terphenyls, dinaphthyl, tetraphenyl ethylene and, the like. Other compounds for such use include diaryl ketones as, for example, benzophenone. When used, the amount of the polycyclic aromatic compound may be varied over a rather wide range but which is relatively small in relationship to the amount of the epoxy reactant. Generally, concentrations in the range of 0.1 to 10 weight percent based on the amount of the epoxy compound is satisfactory.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of dialkali metal salts of diols which comprises reacting an epoxy compound with from about one-half to less than two moles of an alkali metal per mole of said epoxy compound at a temperature below about 0° C., thereby producing a dialkali metal salt of two units of the epoxy compound joined after ring-opening through a carbon-to-carbon bond.

2. A process, as defined in claim 1, wherein the epoxy compound is reacted with the alkali metal in a reaction medium comprising an inert organic ether that is liquid under said reaction conditions.

3. A process, as defined in claim 1, wherein the epoxy compound is reacted with from about 0.9 to about 1.1 moles of alkali metal per mole of said epoxy compound.

4. A process, as defined in claim 1, wherein the alkali metal is finely divided sodium.

5. A process, as defined in claim 1, wherein the epoxy compound is a member from the group consisting of styrene oxide, propylene oxide, ethylene oxide and butadiene monoxide.

6. A process, as defined in claim 1, wherein the reaction is carried out in presence of an ether from the group consisting of tetrahydrofuran, dimethyl ether, 1,2-dimethoxyethane, 1,2-diethoxyethane, dioxane and methyl ethyl ether.

7. A process, as defined in claim 1, wherein the reaction is carried out in presence of a small amount, based on the weight of said epoxy compound, of a polycyclic aromatic compound.

8. A process for preparation of a disodium salt of 2,3-diphenyl-1,4-butanediol which comprises reacting styrene oxide with from about ½ to less than 2 moles of finely divided sodium per mole of said oxide at a temperature below about 0° C., thereby producing a reaction mixture comprising the disodium salt of 2,3-diphenyl-1,4-butanediol.

9. A process, as defined in claim 8, wherein the reaction product comprising the disodium salt of 2,3-diphenyl-1,4-butanediol is hydrolyzed to 2,3-diphenyl-1,4-butanediol.

No references cited.